United States Patent [19]

Togneri et al.

[11] 3,825,816

[45] July 23, 1974

[54] DC-TO-AC AND AC-TO-DC CONVERTER SYSTEMS

[75] Inventors: Mauro Giuseppe Togneri, Houston; Harry Samuel Elliott, Stafford, both of Tex.

[73] Assignee: Varco, Inc., Houston, Tex.

[22] Filed: July 16, 1973

[21] Appl. No.: 379,331

[52] U.S. Cl. .................... 321/18, 307/260, 321/44, 321/47, 328/26

[51] Int. Cl. .................... H02m 7/00

[58] Field of Search ........ 307/260, 261; 321/47, 18; 328/26

[56] References Cited

UNITED STATES PATENTS

| | | | |
|---|---|---|---|
| 3,122,676 | 2/1964 | Kind | 307/260 X |
| 3,373,334 | 3/1968 | Geisz et al. | 321/18 X |
| 3,488,598 | 1/1970 | Hoo | 308/261 X |
| 3,491,252 | 1/1970 | Petrohilos | 321/8 R |
| 3,535,556 | 10/1970 | Hall | 328/26 X |
| 3,564,389 | 5/1969 | Richman | 321/47 X |
| 3,652,945 | 3/1972 | Nakane et al. | 328/26 X |
| 3,721,891 | 3/1973 | Moses | 321/47 |

*Primary Examiner*—William M. Shoop, Jr.
*Attorney, Agent, or Firm*—Pugh & Laiche

[57] ABSTRACT

A signal conversion system wherein variable amplitude, direct current or voltage signals from instrument sensors, which represent the magnitude of measured physical variables by amplitude modulated direct current or voltage signals, are converted to variable amplitude alternating current voltage signals at a frequency determined by the reference signal frequency of the said signal conversion system (usually 60 cycles) (FIG. 1) and a second signal conversion system wherein variable amplitude alternating current signals from instrument sensors, which represent the magnitude of measured physical variables or control signals by amplitude modulated alternating current voltage signals, are converted to variable amplitude direct current or voltage signals (FIG. 2). In both types of conversion, the input signal is filtered for normal mode noise and filtered by a feedback portion of the system for common mode noise. The conversion process also includes mangitude scaling of the variable amplitude input signal, including but not limited to, square root extraction and linear amplitude adjustment.

15 Claims, 2 Drawing Figures

DC-TO-AC AND AC-TO-DC CONVERTER SYSTEMS

BACKGROUND AND SUMMARY OF THE INVENTION

The present invention relates to an electronic signal conversion system which includes an electrical signal to be converted and provides a unique and particularly useful way of converting the value of the signal, which is represented by the magnitude of the signal to be converted, said signal being direct current (hereinafter DC) or alternating current (hereinafter AC), to a corresponding value of that signal, which is represented by the magnitude of the converted signal, said signal being AC or DC, respectively.

Heretofore, several systems for handling this type of electrical conversion have been taught by the prior art. Probably the best known systems of this type take a fixed amplitude DC or AC signal and convert it to a fixed amplitude AC or DC signal, respectively This type of prior art system has the substantial drawback that it produces a fixed amplitude DC or AC signal as a result of the conversion and requires a fixed amplitude input signal. Another known system of this type converts a variable amplitude DC signal through the use of a mechanical device such as a resistance "pot" whose setting is determined by the amplitude of the input signal to an AC signal. The mechanical setting of an electrical circuit element then causes a change in the output signal level. This type of prior art system has the substantial drawback that it is electromechanical in nature and suffers from the same reliability problems that any mechanically set device inherently has of wearing out through mechanical action.

In the present invention, the input signal, either DC or AC and of any predetermined range, is introduced into the DC to AC or AC to DC converter, respectively, wherein the signal is isolated, and common and normal mode noise eliminated. The DC to AC or AC TO DC converter then scales, chops, and smooths the input signal to the form necessary or desirable for the output signal. There is no mechanical coupling and all input and output signals are allowed to be variable within predefined ranges. The present invention is completely electronic through the use of novel circuit techniques.

BRIEF DESCRIPTION OF THE DRAWINGS

For a further understanding of the nature and objects of the present invention, reference should be had to the following detailed description, taken in conjunctions with the accompanying drawings, in which like parts are given like reference numerals and wherein.

DESCRIPTION OF THE PREFERRED EMBODIMENTS

DC/AC Converter

Figure 1:
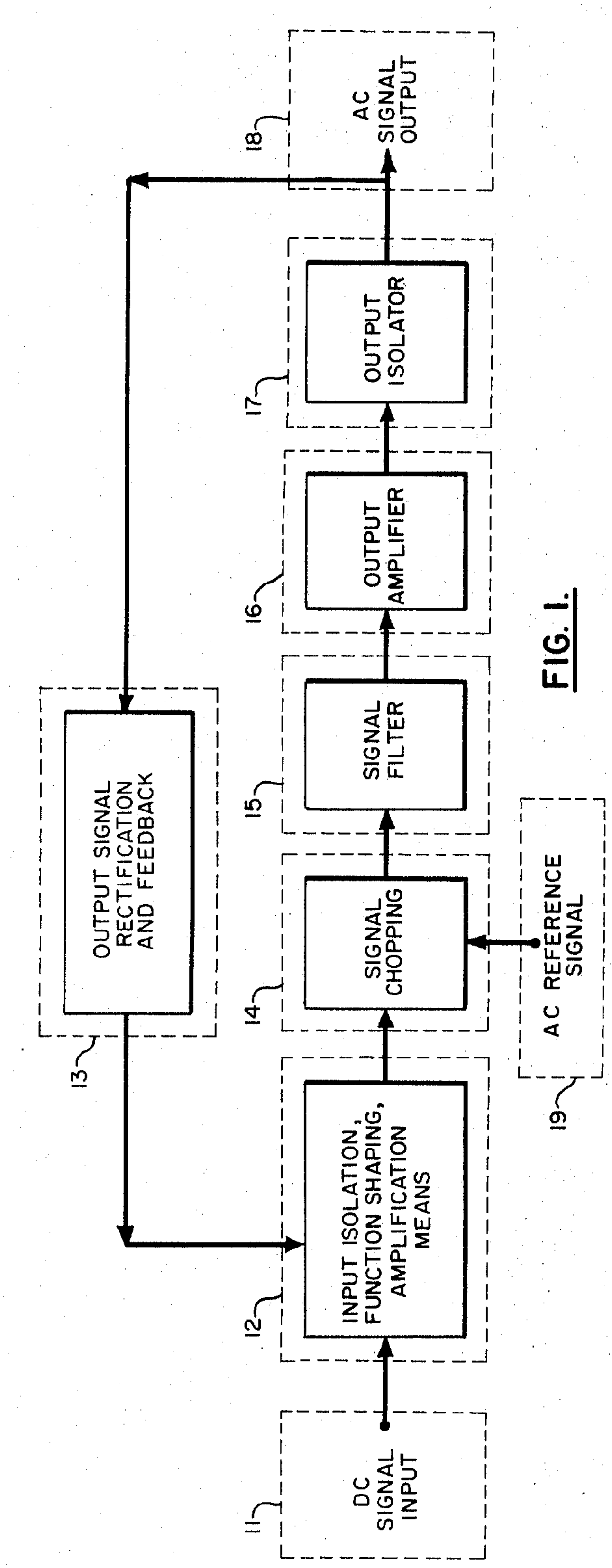
FIG. 1 is a schematized block diagram of the system of the present invention in generalized form for conversion of DC variable amplitude signals to AC variable amplitude signals.

FIG. 1 illustrates the DC to AC converter system (hereinafter DC system) of the present invention in a generalized block diagram form. In order to best understand the principles of the present invention, a brief description of the components of FIG. 1 is given below in tabular form:

The numbered components of FIG. 1 are:

11: DC Signal Input. The input which is a DC signal that can be of any predetermined DC range, such as, for example, 1 to 5 volts or 1 to 5 milliamps or 4 to 20 milliamps or 10 to 50 milliamps, within the limits of the amplifier and resistors accordingly selected for input isolation means 12. The signal introduction is usually through the use of a "dropping" resistor.

12: Input Isolation and Amplification Means. The input isolation and amplification means, which is usually accomplished through the use of a high gain comparison amplifier with diode and capacitor feedback accepts the DC signal input 11 in comparison to the output of the output signal rectification, feedback, and function shaping means 13 to isolate the component of the DC input signal thus eliminating common mode and filtering normal mode. Thus the input isolation and amplification means in conjunction with output signal rectification, feedback, and function shaping means 13 effectively isolates the input 11 from the conversion components of the DC system 14, 15, 16, 17 and 19 and filters both common and normal mode noise from the input 11. The input isolation and amplification means in conjunction with the output signal rectification, feedback and function shaping means 13 which is feedback to the input isolation means does any function shaping necessary and makes the proper amplitude adjustment to the input signal.

13: output Signal Rectification, Feedback, and Function Shaping Means. The output signal rectification, feedback, and function shaping means uses the output 18 as feedback into the input isolation and amplification means 12 for signal stability. It performs span amplification (scaling), elimination of any common mode noise, and any function scaling necessary (such as, for example, square root conversion for flow inputs which are measured by differential pressure). The output signal rectification, feedback, and function shaping means is also the AC to DC converter when coupled to an amplification means used as output amplifier means similar to input isolation and amplification means 12 with the output signal rectification, feedback, and function shaping means output as the only input. As detailed in the description of components 22, 23 and 24, the output isolation is usually accomplished by transformer coupling. Span amplification and rectification is usually performed through a high gain amplifier with resistive and diode feedback and an input variable resistor. Function shaping is performed by another set of high gain amplifiers, the number of amplifiers and feedback components being chosen for the function selected. The value of the output signal rectification, feedback, and function shaping means may be read as a variable amplitude DC signal output 132 by placing a feedback amplifier and integrator means 131, usually accomplished by a high gain amplifier with capacitor feedback, on the output of the output signal rectification, feedback, and function shaping means.

14: Signal Chopping Means. The DC signal is chopped using the AC reference signal means 19 frequency and input rectification through the input isolation and amplification means 12 and output signal rectification, feedback, and function shaping means 13 to produce the proper frequency for the AC signal output 18 of the DC system. The chopping is usually accomplished by connection of the output of the input isolation and amplification means 12 with the output of the AC reference signal means 19 and feeding them into a high gain amplifier with resistor and diode feedback.

15: Band Pass Filter Means. The band pass filter means smooths the chopped, variable amplitude DC signal fed to it to the preamplified AC signal and is tuned to the frequency of the AC reference signal means 19 which permits only the frequency of the AC reference signal means 19 with the amplitude corresponding to the input signal 11 to go to the output amplifier means 16. The smoothing is usually accomplished by high gain amplifier with resistor and capacitor feedback.

16: Output Amplifier Means. Output amplifier means scales the preamplified AC signal to the appropriate magnitude range. The amplification is usually accomplished by transistor driving.

17: Output Isolator Means. The output isolator means isolates the amplified AC signal to prevent any direct current component from becoming introduced as part of the AC signal output 18. The isolation is usually accomplished by transformer coupling.

18: AC Signal Output. The AC output signal is an appropriately scaled AC signal, such as 0 to 40 volts, of the same frequency as the reference signal means 19.

19: AC Reference Signal Means. The AC reference signal means controls the frequency and phase of the AC output signal 18 through the use of DC system components 14 and 15. The AC reference signal means is composed of two parts, the reference signal which sets the base frequency and the phase adjustment means which adjusts the frequency relation between the AC signal output and the reference signal. The reference signal is typically a 60 Hertz, AC signal of fixed amplitude. The phase adjustment means is usually accomplished by a resistor, capacitor, diode network.

Using the component nomenclature of FIG. 1, the variable DC signal input 11 is introduced to the input isolation and amplification means 12 which scales the DC variable input, as well as subtracts common and normal mode noise, and performs function shaping in conjunction with the output signal rectification, feedback, and function shaping means 13. The isolated, scaled DC signal is then chopped at the frequency of the AC reference signal means 19 by using the signal chopping means 14 in conjunction with the input isolation and amplification means 12 and the output signal rectification, feedback, and function shaping means 13. This chopped (square wave) signal is then shaped, filtered and properly phased at the frequency of the AC reference signal means 19, still preserving the amplitude relationship to the original variable amplitude DC signal input 11, thereby converting the original variable amplitude DC signal input 11 to a sinusoidal (AC) signal at the frequency of the AC reference signal means 19. The signal is then amplified to the proper range by the output amplifier means 16 and isolated from the direct current component of the amplified AC signal by the output isolator means 17 before becoming the AC signal output 18.

AC/DC Converter

Figure 2:
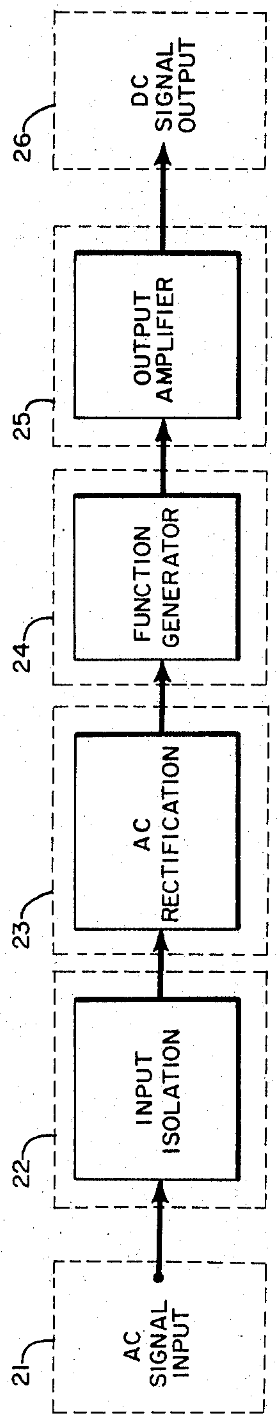
FIG. 2 is a schematized block diagram of the system of the present invention in generalized form for conversion of AC variable amplitude signals to DC variable amplitude signals.

FIG. 2 illustrates the AC/DC converter system (hereinafter AC system) of the present invention in a generalized block diagram form. In order to best understand the principles of the present invention, a brief description of the components of FIG. 2 is given below in tabular form.

The components of FIG. 2 are:

21: AC Input Signal. The input which is an AC signal that can be of any predetermined range, such as for example 0 to 40 volts, within the limits of the amplifier, transformer, and resistors accordingly selected.

22: Input Isolation Means. Input isolation means isolates the AC signal input from the other parts of the system 23, 24, 25 and 26. The isolation is usually accomplished through transformer coupling.

23: AC Rectification Means. AC rectification means converts the signal to a rectified form thereby generating a DC component to the signal. Rectification is usually accomplished through the use of a high gain amplifier with resistor and diode feedback. The input is also scaled (span) for the appropriate output range usually through a resistive "pot" on the input of the amplifier. The input is also filtered for common and normal mode noise.

24: Function Means. Function means shapes the rectified signal to whatever form is desirable such as square root extraction used in conjunction or independently of AC rectification means 23. Function shaping is performed by a set of high gain amplifiers, the number of amplifiers and feedback components being chosen for the function selected.

25: Output Amplifier Means. The output amplifier means scales and filters the functionally shaped rectified signal to the appropriate level for output as a DC signal output 26. Scaling is performed usually by a high gain amplifier with capacitor and resistor feedback, the output of which is the base voltage to a transistor.

26: DC Signal Output. The final output of the AC system is a DC signal that can be of any predetermined range such as for example 1 to 5 volts, 4 to 20 milliamps, 10 to 50 milliamps, or 1 to 5 milliamps. The scaling is performed by resistor choice.

Using the component nomenclature of FIG. 2, the variable magnitude AC signal input 21 is introduced to the input isolation means 22, such as a transformer, which subtracts any DC common mode noise in the input. The signal is then introduced to the AC rectification means 23, to eliminate the remaining noise components, rectify the AC signal and scale the signal to the appropriate output range while still preserving the amplitude relationship to the original AC input signal. The signal is then introduced to function means 24, if any additional scaling, such as square root, is needed, in order to perform the functional scaling. Finally the rectified, scaled and shaped signal is introduced to the output amplification means 25 where the signal is scaled and shaped to the DC signal output 26.

Because many varying and different embodiments may be made within the scope of the inventive concept herein taught, such as methods of chopping the DC input signal, and because many modifications may be made in the embodiments herein detailed in accordance with the descriptive requirements of the law, it is to be understood that the details herein are to be interpreted as illustrative and not in a limiting sense.

What is claimed as invention is:

1. A DC to AC converter system which includes a variable magnitude input DC signal that is to be converted to a variable magnitude output AC signal comprising the following interconnected electrical components:

said variable magnitude input DC signal being introduced to input isolation and amplification means for electrically isolating the variable magnitude input DC signal from the rest of the system, said input isolation and amplification means being connected between said variable magnitude input DC signal and said output signal rectification, feedback, and function shaping means and said signal chopping means;

signal chopping means through the use of an AC reference signal means to impose a frequency spectrum on the DC signal with the predominant frequency that of the AC reference signal means, said signal chopping means being connected between said input isolation and amplification means and said band pass signal means;

band pass filter means for allowing only the preselected frequency component of the chopped input signal from passing to the output amplifier means, said band pass filter means being connected between said signal chopping means and said output amplifier means;

output amplifier means for changing the AC signal level to the predetermined AC voltage range, said output amplifier means being connected between said band pass filter means and said output isolator means;

output isolator means for electrically isolating the AC signal output from the rest of the system and to provide any further amplification necessary, said output isolator means being connected between said output amplifier means and said variable magnitude output AC signal;

output signal rectification, feedback, and function shaping means for rectification of the variable magnitude output AC signal to a variable magnitude DC signal to be used for noise rejection, function shaping by magnitude adjustment and range (span) adjustment, said output signal rectification, feedback, and function shaping means being connected between said variable magnitude output AC signal and said input isolation and amplification means;

AC signal reference means for adjustment of the phase of a fixed frequency AC reference signal of the frequency of the AC signal output to the phase of the AC signal output said AC reference signal means being connected to the signal chopping means.

2. The DC to AC converter system of claim 1 wherein the said function shaping of the output signal rectification, feedback and function shaping means is equality.

3. The DC to AC converter system of claim 1 wherein the said function shaping of the output signal rectification, feedback and function shaping means is a square root function.

4. The DC to AC converter system of claim 1 wherein the said AC reference signal is a sixty Hertz signal.

5. The DC to AC converter system of claim 4 wherein the said signal filter means filters all but sixty Hertz signals.

6. A unique AC to DC converter system which includes a variable magnitude AC signal input that is to be converted to a variable magnitude DC signal output comprising the following interconnected electrical components:

input isolation means for electrically isolating the variable magnitude input signal from the rest of the system, said input isolation means being connected between said variable magnitude AC signal input and said AC rectification means;

AC rectification means for establishing a DC component to the said variable magnitude AC signal input, said AC rectification means being connected between said input isolation means and said function means;

function means for signal and magnitude adjustment determined by a predefined function in the system, said function means being connected between said AC rectification means and said output amplifier means;

output amplifier means to smooth the said rectified and functionally shaped variable magnitude input AC signal and amplify the said signal to the appropriate output range, said output amplifier means being connected between said function means and said variable magnitude DC signal output.

7. The AC to DC converter system of claim 6 wherein the said function means is equality.

8. The AC to DC converter system of claim 6 wherein the said function means is a square root function.

9. The method of converting variable magnitude DC signals to corresponding variable magnitude AC signals comprising the steps of:

a. feeding the variable magnitude DC signal to an input isolation circuit directly, and
b. feeding the variable magnitude AC signal output to the same input isolation circuit through an output signal rectification, feedback, and function shaping circuit;
c. producing a functionally shaped, isolated, and amplified signal;
d. feeding the said signal of step "c" to a chopping circuit, and
e. feeding an AC reference signal through a phase adjustment circuit to the said chopping circuit;
f. producing a frequency spectrum on the said output signal of step "c" with the predominant frequency that of the said AC reference signal;

g. feeding the said produced signal of step "f" to a band pass filter circuit which is tuned to allow only the frequency of the said AC reference signal to produce an AC signal of corresponding magnitude to the magnitude of the DC input signal at a frequency of the said AC reference signal;

h. feeding the said produced signal of step "g" to an amplifier circuit to produce the necessary voltage to comply with the span specification of the variable magnitude output AC signal after the signal produced by this step is fed into the output isolation circuit;

i. feeding the said produced signal of step i "h" to an output isolation circuit to isolate the produced variable magnitude AC signal from the rest of the circuit, the output of this circuit comprising said variable magnitude AC signal; and j. feeding the said variable magnitude AC signal to a feedback circuit to produce a rectified, functionally shaped, and span amplified signal for use in step "*b*."

10. The method of claim 9 wherein the said function shaping circuit is a square root function.

11. The method of claim 9 wherein the said function shaping circuit is equality.

12. The method of converting variable magnitude AC signal inputs to corresponding variable magnitude DC signal outputs comprising the steps of:

a. feeding the variable magnitude AC signal input to an input isolation circuit;

b. producing an isolated input signal;

c. feeding said isolated input signal to an AC rectification circuit to produce a signal with a DC component;

d. feeding the produced signal of step "c" to a function shaping circuit to produce a magnitude adjustment in the produced signal of step "c" determined by a predetermined function in the system; and e. feeding the produced signal of step "*d*" to an output amplification circuit to smooth the said produced signal of step "*d*" to eliminate all of the components except the DC component of said signal, the output of this circuit comprising said variable magnitude DC signal output.

13. The method of claim 12 wherein the said function circuit is equality.

14. The method of claim 12 wherein the said function circuit is a square root circuit.

15. A DC to AC converter system which includes a variable magnitude input DC signal that is to be converted to a variable magnitude output AC signal comprisng the following interconnected electrical components:

said variable magnitude input DC signal being introduced to input isolation and amplification means for electrically isolating the variable magnitude input DC signal from the rest of the system, said input isolation and amplification means being connected between said variable magnitude input DC signal and said output signal rectification, feedback, and function shaping means and said signal chopping means;

signal chopping means through the use of an AC reference signal means to impose a frequency spectrum on the DC signal with the predominant frequency that of the AC reference signal means, said signal chopping means being connected between said input isolation and amplification means and said band pass signal means;

band pass filter means for allowing only the preselected frequency component of the chopped input signal from passing to the output amplifier means, said band pass filter means being connected between said signal chopping means and said output amplifier means;

output amplifier means for changing the AC signal level to the predetermined AC voltage range, said output amplifier means being connected between said band pass filter means and said output isolator means;

output isolator means for electrically isolating the AC signal output from the rest of the system and to provide any further amplification necessary, said output isolator means being connected between said output amplifier means and said variable magnitude output AC signal;

output signal rectification, feedback, and function shaping means for rectification of the variable magnitude output AC signal to a variable magnitude DC signal to be used for noise rejection, function shaping by magnitude adjustment and range (span) adjustment, said output signal rectification, feedback, and function shaping means being connected between said variable magnitude output AC signal and said input isolation and amplification means;

AC signal reference means for adjustment of the phase of a fixed frequency AC reference signal of the frequency of the AC signal output to the phase of the AC signal output said AC reference signal means being connected to the signal chopping means;

feedback amplifier and integrator means for smoothing the output of the output signal rectification, feedback and function shaping means thereby reproducing the said variable magnitude input DC signal without noise but with function shaping, said feedback amplifier and integrator means being connected to said output signal rectification, feedback and function shaping means and producing a variable magnitude DC signal corresponding to the said variable magnitude input DC signal with function shaping imposed.

* * * * *